(12) United States Patent
Watson et al.

(10) Patent No.: US 11,671,052 B2
(45) Date of Patent: Jun. 6, 2023

(54) SOLAR MODULE MOUNTING BRACKET ASSEMBLIES

(71) Applicant: NEXTracker Inc., Fremont, CA (US)

(72) Inventors: Tyler Joseph Watson, San Francisco, CA (US); Ricardo Delgado-Nanez, San Jose, CA (US)

(73) Assignee: NEXTRACKER LLC, Fremont, CA (US)

( * ) Notice: Subject to any disclaimer, the term of this patent is extended or adjusted under 35 U.S.C. 154(b) by 0 days.

(21) Appl. No.: 17/584,021

(22) Filed: Jan. 25, 2022

(65) Prior Publication Data

US 2022/0149772 A1 May 12, 2022

Related U.S. Application Data

(63) Continuation of application No. 16/991,585, filed on Aug. 12, 2020, now Pat. No. 11,251,748, which is a
(Continued)

(51) Int. Cl.
*H01L 31/042* (2014.01)
*H02S 10/00* (2014.01)
*H02S 30/00* (2014.01)
*H02S 30/20* (2014.01)
*H02S 20/30* (2014.01)
(Continued)

(52) U.S. Cl.
CPC ............. *H02S 30/20* (2014.12); *H02S 20/30* (2014.12); *H02S 30/10* (2014.12); *F24S 25/634* (2018.05); *F24S 25/65* (2018.05); *F24S 2025/6003* (2018.05)

(58) Field of Classification Search
CPC .......... H02S 30/20; H02S 20/30; H02S 30/10; H02S 30/00; F24S 25/634; F24S 25/65; F24S 2025/6003; F24S 2025/012; F24S 2025/804; F24S 25/636; F24S 25/70; F24S 25/13; F24S 30/425; Y02E 10/47; Y02E 10/50; F16B 9/02; F16B 5/06; F16B 2/14
See application file for complete search history.

(56) References Cited

U.S. PATENT DOCUMENTS

| 4,089,148 A | 5/1978 | Oehmsen et al. |
| 4,148,456 A | 4/1979 | Garchinsky |

(Continued)

FOREIGN PATENT DOCUMENTS

| CN | 202905734 U | * | 4/2013 |
| CN | 202905734 U |   | 4/2013 |
| WO | 2017155798 A1 |   | 9/2017 |

OTHER PUBLICATIONS

English machine translation of CN 202905734 (Year: 2023).*
(Continued)

*Primary Examiner* — Angelo Trivisonno
(74) *Attorney, Agent, or Firm* — Weber Rosselli & Cannon LLP (57) ABSTRACT

A solar module mounting bracket assembly includes a rail configured to support a solar module thereon, and a pair of braces. The braces each have a first end portion movably coupled to the rail. The braces are movable relative to the rail between a collapsed configuration and an expanded configuration. In the expanded configuration, the braces cooperatively define a channel dimensioned for receipt of a frame member.

14 Claims, 10 Drawing Sheets

Related U.S. Application Data continuation of application No. 16/116,238, filed on Aug. 29, 2018, now Pat. No. 10,797,635.

(51) Int. Cl.
*H02S 30/10* (2014.01)
*F24S 25/60* (2018.01)
*F24S 25/634* (2018.01)
*F24S 25/65* (2018.01)

(56) References Cited

U.S. PATENT DOCUMENTS

| | | |
|---|---|---|
| 7,435,897 B2 | 10/2008 | Russell |
| 8,156,697 B2 | 4/2012 | Miros et al. |
| 8,316,590 B2 | 11/2012 | Cusson |
| 8,375,654 B1 | 2/2013 | West et al. |
| 8,413,944 B2 | 4/2013 | Harberts et al. |
| 8,661,747 B2 | 3/2014 | Eide |
| 8,875,455 B1 | 11/2014 | Yang et al. |
| 9,347,691 B2 | 5/2016 | West et al. |
| 2008/0308091 A1 | 12/2008 | Corio |
| 2009/0250580 A1 | 10/2009 | Strizki |
| 2010/0065108 A1 | 3/2010 | West et al. |
| 2010/0089389 A1 | 4/2010 | Seery et al. |
| 2010/0236183 A1 | 9/2010 | Cusson et al. |
| 2010/0237029 A1 | 9/2010 | Cusson et al. |
| 2010/0243023 A1 | 9/2010 | Patton et al. |
| 2010/0269428 A1 | 10/2010 | Stancel et al. |
| 2010/0276558 A1 | 11/2010 | Faust et al. |
| 2010/0319277 A1 | 12/2010 | Suarez et al. |
| 2011/0000520 A1 | 1/2011 | West |
| 2011/0088740 A1 | 4/2011 | Mittan et al. |
| 2011/0214366 A1 | 9/2011 | Haddock et al. |
| 2011/0232212 A1 | 9/2011 | Pierson et al. |
| 2011/0253190 A1 | 10/2011 | Farnham |
| 2011/0265860 A1 | 11/2011 | Ciasulli et al. |
| 2012/0073220 A1 | 3/2012 | Kobayashi et al. |
| 2012/0152326 A1 | 6/2012 | West et al. |
| 2012/0175322 A1 | 7/2012 | Park et al. |
| 2012/0285515 A1 | 11/2012 | Sagayama |
| 2012/0298188 A1 | 11/2012 | West et al. |
| 2013/0011187 A1 | 1/2013 | Schuit et al. |
| 2013/0125959 A1 | 5/2013 | Sagayama et al. |
| 2013/0340358 A1 | 12/2013 | Danning |
| 2014/0174511 A1 | 6/2014 | West et al. |
| 2014/0246549 A1 | 9/2014 | West et al. |
| 2015/0200621 A1* | 7/2015 | Reed .................. F24S 25/636 29/525.01 |
| 2016/0190976 A1* | 6/2016 | Corio .................. F24S 25/634 248/214 |
| 2017/0359017 A1* | 12/2017 | Corio .................. F16M 11/10 |

OTHER PUBLICATIONS

Examination Report No. 1 issued in Australian Patent Application No. 2019327491 dated Oct. 21, 2021, 4 pages.
Extended European Search Report issued in European Patent Application No. 19855184.8 dated Apr. 8, 2022, 13 pages.
Notice of Acceptance issued in Australian Patent Application No. 2019327491 dated Mar. 1, 2022, 4 pages.
PCT Search Report and Written Opinion issued in PCT/US2019/048894 dated Oct. 29, 2019, 15 pages.
First Examination Report issued in Indian Patent Application No. 202117006833 dated Aug. 29, 2022 with English translation.
Examination Report No. 1 issued in Australian Patent Application No. 2022202289 dated Feb. 17, 2023.

\* cited by examiner

SOLAR MODULE MOUNTING BRACKET ASSEMBLIES

CROSS-REFERENCE TO RELATED APPLICATION

The present application is a continuation of U.S. patent application Ser. No. 16/991,585, filed on Aug. 12, 2020, which is a continuation of U.S. patent application Ser. No. 16/116,238, filed on Aug. 29, 2019, now U.S. Pat. No. 10,797,635, the entire contents of each of which is hereby incorporated by reference herein.

BACKGROUND

1. Technical Field

The present disclosure relates generally to mounting brackets. More specifically, the present disclosure relates to mounting brackets for coupling solar modules to a framework.

2. Background of Related Art

Solar mounting systems are provided to support and couple an array of one or more photovoltaic ("PV") modules to a framework, such as, for example, a plurality of parallel-oriented, rotatable torque tubes. The solar mounting systems are designed to maintain the PV modules in a fixed position relative to the torque tube while the torque tube is rotating during solar tracking.

Solar mounting systems can add significant cost to a solar power system for at least two reasons. First, the components themselves are expensive to manufacture, ship, and install. Second, installation and operation can be expensive because they require time and skilled operators to conduct quality control measures in the field. Therefore, there is a need for PV mounting systems that are easier and cheaper to package, ship, and install.

SUMMARY

In one aspect of the present disclosure, a solar module mounting bracket assembly is provided. The solar module mounting bracket assembly includes a rail configured to support a solar module thereon, and a pair of braces each having a first end portion movably coupled to the rail. The braces are movable relative to the rail between a collapsed configuration and an expanded configuration. In the expanded configuration, the braces cooperatively define a channel dimensioned for receipt of a frame member.

In aspects, the braces may be parallel with the rail in the collapsed configuration, and perpendicular to the rail in the expanded configuration.

In aspects, the solar module mounting bracket assembly may assume a substantially linear shape when the braces are in the collapsed configuration. In further aspects, the solar module mounting bracket assembly may assume a substantially triangular shape when the braces are in the expanded configuration.

In aspects, the solar module mounting bracket assembly may further include a fastener configured to attach to a second end portion of each of the braces to fix the braces in the expanded configuration.

In aspects, the solar module mounting bracket assembly may further include a pair of truss arms. Each of the truss arms may include a first end portion movably coupled to a respective second end portion of the pair of braces, and a second end portion slidably coupled to a respective first and second end portion of the rail.

In aspects, the truss arms may be configured to move relative to the rail and the braces between a collapsed configuration and an expanded configuration. In the collapsed configuration, the truss arms may be parallel with the rail and the pair of braces, and in expanded configuration, the truss arms may extend perpendicularly relative to the rail.

In aspects, the second end portion of each of the truss arms may be configured to slide away from a central portion of the rail as the pair of truss arms move toward the collapsed configuration.

In aspects, the second end portion of each of the truss arms may move along the rail from an inward position to an outward position. In the inward position, the truss arms may assume the expanded configuration, and in the outward position, the truss arms may assume the collapsed configuration.

In aspects, each of the first and second end portions of the rail may define a track through which the respective second end portion of the truss arms slides.

In aspects, the solar module mounting bracket assembly may further include a fastener assembly coupled to the second end portion of a first of the truss arms. The fastener assembly may be configured to selectively fix the second end portion of the first truss arm in a position on the track of the rail.

In aspects, the fastener assembly may include a pair of washers disposed on opposite sides of the rail, and a fastener coupling the pair of washers to one another. The fastener may be configured to adjust a distance between the washers. At least one of the washers has a pair of first and second tabs extending therefrom. The first and second tabs may be configured for receipt in a corresponding slot defined in the rail.

In aspects, the first washer may further include a third tab extending therefrom. The third tab may be disposed in the track of the rail to guide the fastener assembly through the track.

In aspects, the solar module mounting bracket assembly may further include a protuberance protruding downwardly relative to an underside of the rail. The protuberance may extend into the channel defined by the braces when the braces are in the expanded configuration.

In aspects, each of the braces may have a concave inner surface, such that the channel cooperatively defined by the first and second braces has a circular shape.

In aspects, the solar module mounting bracket assembly may further include a plurality of coupling devices disposed on an upper side of the rail. The coupling devices may be configured to fix a solar module to the rail.

In further aspects of the present disclosure, a PV module mounting bracket assembly is provided that includes a rail, a pair of braces, a fastener, and a pair of truss arms. The rail is configured to support a PV module thereon and has a first end portion, a central portion, and a second end portion. Each of the braces includes a first end portion movably coupled to the central portion of the rail, and a second end portion. The braces are movable relative to the rail between a collapsed configuration and an expanded configuration. In the collapsed configuration, the braces are parallel with the rail, and in the expanded configuration, the braces are perpendicular to the rail and cooperatively define a channel dimensioned for receipt of a frame member. The fastener is configured to attach to the second end portion of each of the braces to fix the braces in the expanded configuration. Each of the truss arms includes a first end portion coupled to the respective second end portion of the pair of braces, and a second end portion slidably coupled to the respective first and second end portions of the rail.

Further details, advantages, and aspects of exemplary embodiments of the present disclosure are described in more detail below with reference to the appended figures.

As used herein, the terms parallel and perpendicular are understood to include relative configurations that are substantially parallel and substantially perpendicular up to about + or −30 degrees from true parallel and true perpendicular.

BRIEF DESCRIPTION OF THE DRAWINGS

Embodiments of the present disclosure are described herein with reference to the accompanying drawings, wherein.

DETAILED DESCRIPTION

Embodiments of the presently disclosed solar module mounting bracket assemblies and methods of installing the same are described in detail with reference to the drawings, in which like reference numerals designate identical or corresponding elements in each of the several views. As described herein, the term "solar module" refers to any suitable solar panel or array of solar panels that convert energy from the sun into usable energy.

The present disclosure, in accordance with various example embodiments thereof, relates to a mounting bracket assembly for coupling one or more solar modules (e.g., PV modules) to a framework. The mounting bracket assembly has a rail for affixing the one or more PV modules thereon, and a pair of braces pivotably coupled to the rail. The braces are movable relative to the rail from a collapsed configuration to an expanded configuration. The collapsed configuration reduces the overall footprint of the mounting bracket assembly, thereby reducing packaging and shipping costs. In the expanded configuration, the braces grasp the framework (e.g., a torque tube) to fix the mounting bracket assembly and, in turn, the one or more PV modules, to the framework. The mounting bracket assembly may also include a pair of truss arms that couple to the respective braces to provide support for the braces. The truss arms are configured to collapse with the braces. These and further details of the mounting bracket assemblies will be described below.

Figure 1:
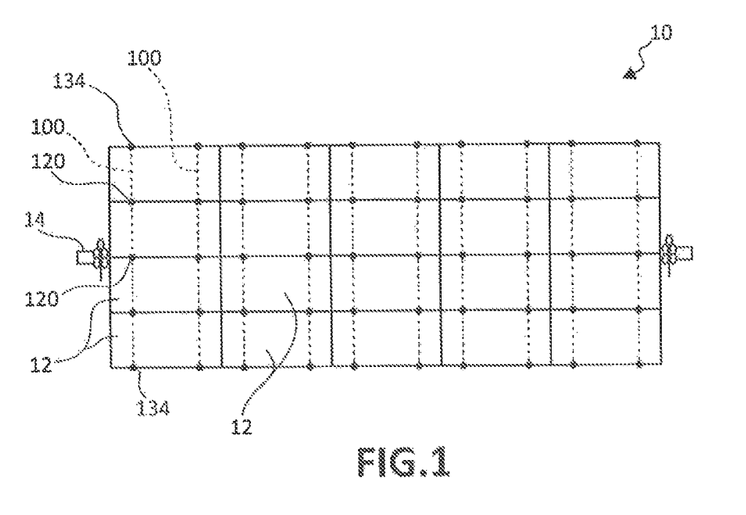
FIG. 1 is a top view of a solar power system in accordance with an exemplary embodiment of the present disclosure.

With reference to FIG. 1, a solar power system 10 is illustrated and generally includes an array of solar modules 12 (e.g., PV modules), a framework, such as, for example, a torque tube 14, and a mounting bracket assembly 100 for coupling the array of PV modules 12 to the torque tube 14. Each of the mounting bracket assemblies 100 may be oriented perpendicularly relative to the torque tube 14 and extend crosswise under each of the PV modules 12. The torque tube 14 is rotatable about an axis to adjust an angular orientation of the PV modules 12 relative to the sun.

While not illustrated, the system 10 may include more than one torque tube 14, connected end to end and wherein each set of end to end connected torque tubes 14 are arranged in a parallel orientation with one another. Each torque tube 14 may have an array of PV modules 12 affixed thereto via a plurality of mounting bracket assemblies 100. In embodiments, two mounting bracket assemblies 100 may be utilized for coupling four PV modules 12 to the torque tube 14. It is contemplated that any suitable number of mounting bracket assemblies 100 are employed to affix any suitable number of PV modules 12 to the torque tube 14.

With reference to FIGS. 2A-9C, an exemplary mounting bracket assembly 100 is illustrated and generally includes an elongated rail 102, a pair of first and second braces 104, 106 movably coupled to the rail 102, and a pair of first and second truss arms 108, 110 for supporting the first and second braces 104, 106 relative to the rail 102. The rail 102 has a generally rectangular shape and a U-shaped cross-sectional configuration. The rail 102 includes an upper wall 112, and a pair of lateral side walls 114, 116 extending perpendicularly downward from the upper wall 112, thus forming a U-shaped channel 118 in an underside of the rail 102. The rail 102 has opposing first and second end portions 102a, 102b and defines a longitudinal axis "X" therebetween. It is contemplated that the rail 102 may assume any suitable shape, such as square, rounded, or the like.

Figure 2A:
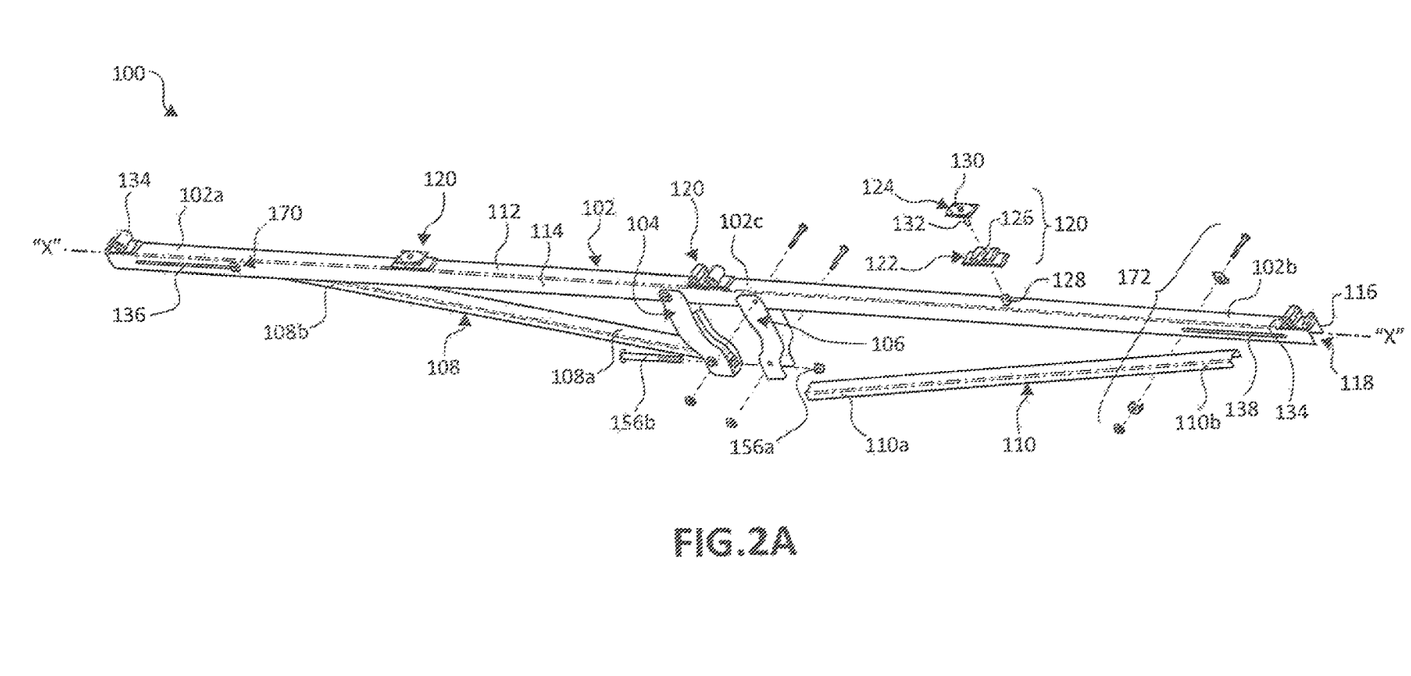
FIG. 2A is a perspective view, with parts separated, of an exemplary embodiment of a solar modular mounting bracket assembly of the solar power system of FIG. 1.

With specific reference to FIG. 2A, the rail 102 has a plurality of coupling devices 120 disposed on the upper wall 112 of the rail 102. The coupling devices 120 are spaced from one another along the longitudinal axis "X" of the rail 102. Each of the coupling devices 120 includes a support member 122 that is fixed to the upper wall 112 of the rail 102, and a clip 124 detachably coupled to the support member 122. The support member 122 may be fabricated from a relatively pliable material, such as, for example, an elastomer, to provide a forgiving surface on which a PV module 12 is to be seated. The support member 122 defines an opening 126 therethrough dimensioned for receipt of a shroud 128. The shroud 128 extends upwardly from the upper wall 112 of the rail 102 and is fixed thereto. The clip 124 of the coupling device 120 includes a plate member 130 and a fastener 132 (e.g., a screw) extending downwardly therefrom. The fastener 132 of the clip 124 is configured to be coupled (e.g., via threaded engagement or friction-fit engagement) with the shroud 128.

Figure 2B:
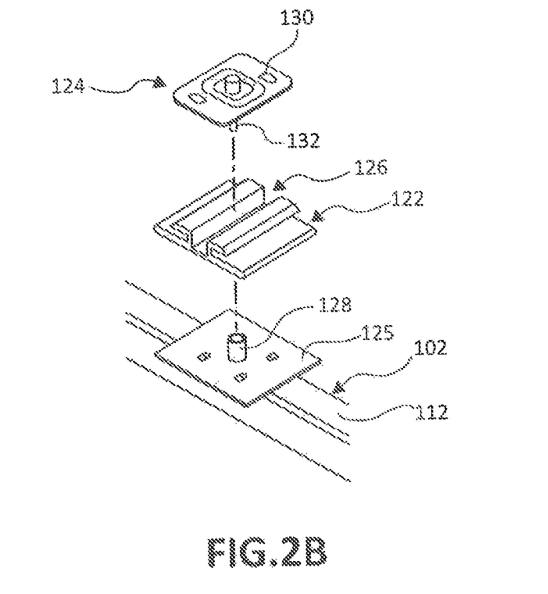
FIG. 2B is a top, perspective view of an alternative embodiment of a coupling device for coupling a solar module to a rail.
Figure 2C:
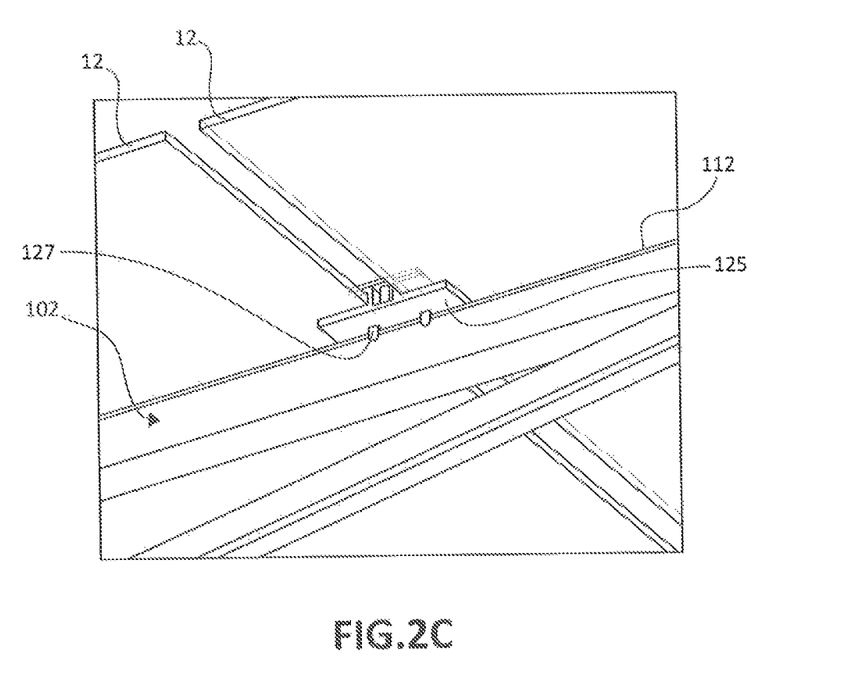
FIG. 2C is a bottom, perspective view of the coupling device of FIG. 2B.

FIG. 2B depicts a further aspect of the present disclosure related to the coupling device 120. Specifically this aspect employs a pad 125 which supports the support member 122 and is received on the shroud 128 to attach the pad 125 to the rail 102. In embodiments, the pad 125 may have a plurality of tabs 127 configured to clip the pad 125 to the upper wall 112 of the rail 102. It is contemplated that the pad 125 may have any suitable fastening mechanism for attaching to the rail 102, such as, for example, adhesives. The pad 125 allows for reduction of the width of the rail 102 while providing an adequate bearing surface for solar modules 12. The pad 125 may be formed of sheet metal and placed under the support member 122. The increased width of the pad 125 compared to the rail 102 width allows the rail 102 to provide increased support for the module 12 while limiting the size of the rail 102 and thus reduces weight and potential costs. FIG. 2C depicts a bottom perspective view of the coupling device 120 attached to a rail 102 and showing the pad 125 and support member 122 extending over the edges of the rail 102.

During assembly, with two longitudinal sides of a pair of adjacent PV modules 12 (FIG. 1) positioned on the support member 122 of the coupling device 120, the fastener 132 of the clip 124 is positioned through the opening 126 of the support member 122 and threadedly coupled to a threaded inner surface of the shroud 128. In embodiments, the fastener 132 of the clip 124 may be fastened to the shroud 128 via a friction-fit engagement. The plate member 130 of the clip 124 is approximated towards the support member 122 (e.g., via rotation of the fastener 132) until the PV modules 12 are captured between the plate member 130 of the clip 124 and the support member 122.

It is contemplated that the rail 102 may also have coupling devices in the form of flexible, hook-shaped members 134 disposed on opposing first and second end portions 102a, 102b of the rail 102. The hook-shaped members 134 are configured to snap over an end of a PV module 12 to resist movement of the PV module 12 along the longitudinal axis "X" of the rail 102.

The first end portion 102a of the rail 102 defines a first pair of linear tracks 136 in the opposing lateral side walls 114, 116 of the rail 102 (only the track 136 in the first side wall 114 is illustrated in FIG. 2A). Similarly, the second end portion 102b of the rail 102 defines a second pair of linear tracks 138 in the opposing lateral side walls 114, 116 of the rail 102 (only the track 138 in the first side wall 114 is illustrated in FIG. 2A). In embodiments, the tracks 136, 138 may be curved or assume any other suitable shape. As will be described in further detail below, the first pair of tracks 136 permits for the slidable coupling of the first truss arm 108 to the rail 102, and the second pair of tracks 138 permits for the slidable coupling of the second truss arm 110 to the rail 102.

Figure 3:
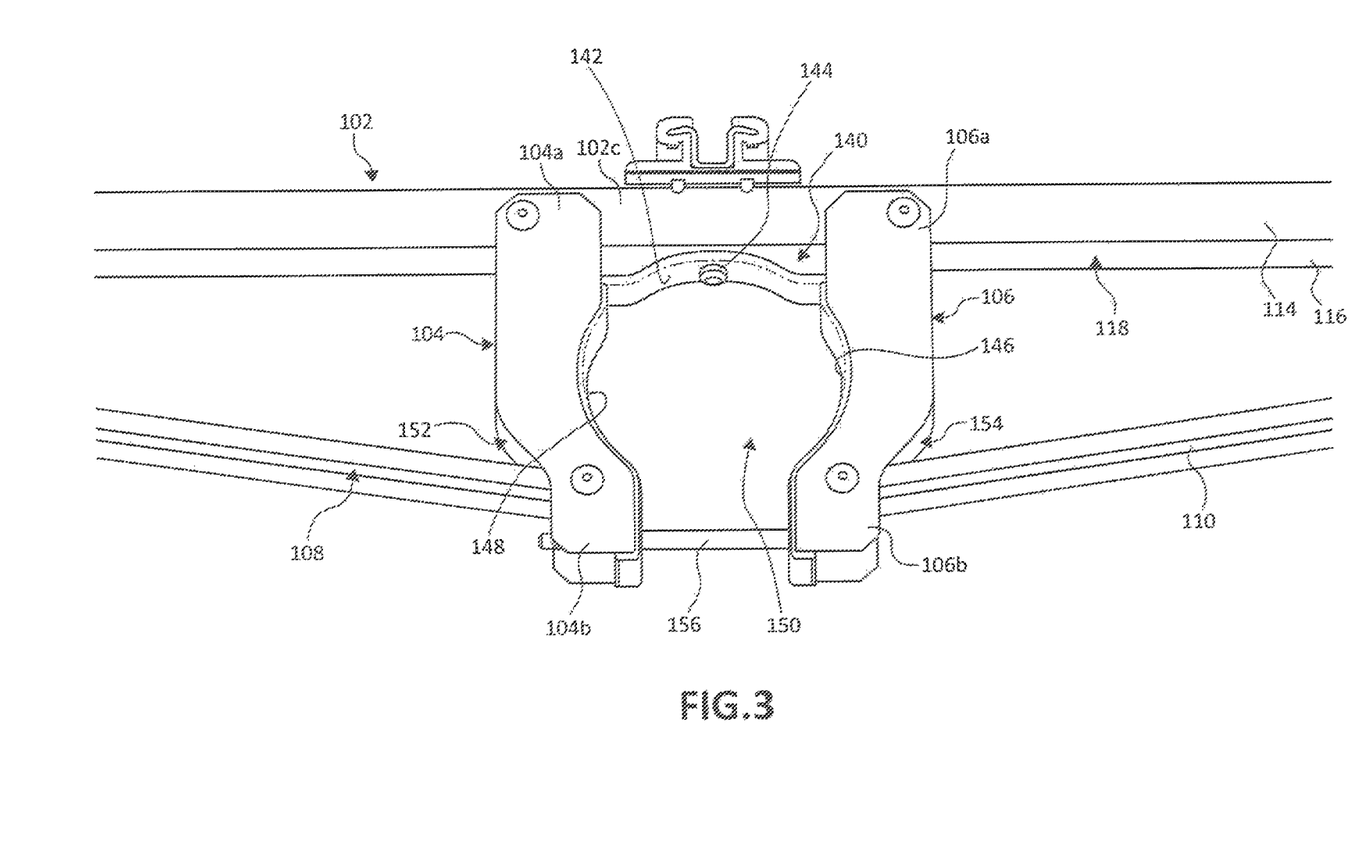
FIG. 3 is an enlarged side view of the mounting bracket assembly of FIG. 2A shown in an expanded or in-use configuration.
Figure 4:
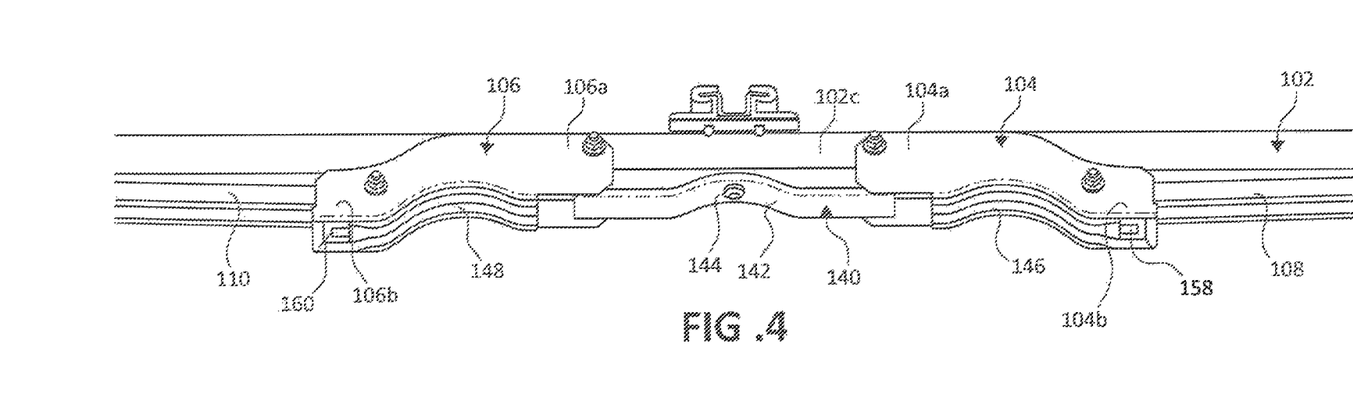
FIG. 4 is an enlarged side view of the mounting bracket assembly of FIG. 2A shown in a collapsed or shipping configuration.

As best shown in FIGS. 3 and 4, the rail 102 has a center portion 102c disposed between the first and second end portions 102a, 102b of the rail 102. The center portion 102c of the rail 102 may have an insert 140 disposed within the channel 118 of the rail 102 and between the pair of braces 104, 106. The insert 140 has a concave inner surface 142 and a protuberance 144 extending downwardly from the inner surface 142 thereof. The protuberance 144 may have a rounded configuration (e.g., dome-shaped) and be fabricated from a pliable material, such as, for example, an elastomer. In some embodiments, the protuberance 144 may be fabricated from any suitable material, such as, for example, a metal. The protuberance 144 is configured to enhance the frictional engagement between the mounting bracket assembly 100 and the torque tube (FIG. 1) when the torque tube 100 is captured between the pair of braces 104, 106, as will be described.

With reference to FIGS. 2A-6, each of the first and second braces 104, 106 has a first end portion 104a, 106a and a second end portion 104b, 106b. The first end portion 104a, 106a of each of the braces 104, 106 is coupled to the center portion 102c of the rail via a fastener, such as, for example, a nut and bolt assembly. The first end portion 104a, 106a of the braces 104, 106 is pivotable relative to the rail 102 between an in-use or expanded configuration, as shown in FIG. 3, and a shipping or collapsed configuration, as shown in FIG. 4. In the expanded configuration, the braces 104, 106 are disposed in perpendicular relation to the longitudinal axis "X" of the rail 102. In the collapsed configuration, the braces 104, 106 are coaxial with the longitudinal axis "X" of the rail 102, whereby the mounting bracket assembly 100 has a substantially reduced overall profile.

The braces 104, 106 may each have a concave inner surface 146, 148, respectively. When the braces 104, 106 are in the expanded configuration, the concave inner surfaces 146 of the braces 104, 106 and the concave inner surface 142 of the insert 140 cooperatively define a circular channel 150 dimensioned for receipt of the torque tube 14 (FIG. 1). The braces 104, 106 each have a generally U-shaped transverse cross-sectional configuration and define a longitudinally-extending U-shaped channel 152, 154, respectively. The U-shaped channel 152, 154 of each of the braces 104, 106 is configured to receive the lateral side walls 114, 116 of the rail 102 upon the braces 104, 106 moving toward the collapsed configuration.

The mounting bracket assembly 100 further includes a main fastener 156, such as, for example, a nut 156a and a bolt 156b, interconnecting the second portions 104b, 106b of the first and second braces 104, 106. The main fastener 156 is configured to extend through an opening 158, 160 (FIG. 4) defined in the respective second end portions 104b, 106b of the braces 104, 106. The main fastener 156 is configured to selectively lock the braces 104, 106 in the expanded configuration and close the circular channel 150. An approximation of the nut 156a and bolt 156b drives the second end portions 104b, 106b of the braces 104, 106 closer to one another to constrict the circular channel 150 about the torque tube 14.

Figure 5:
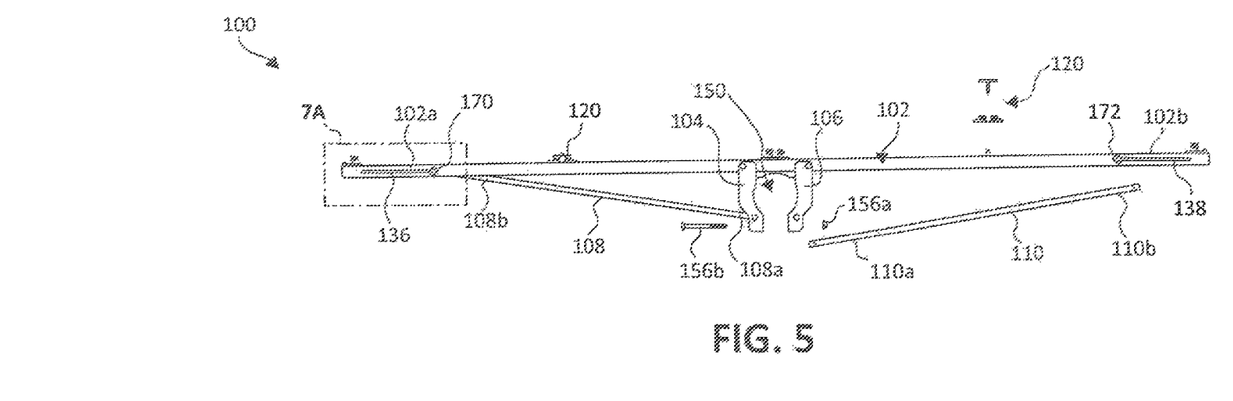
FIG. 5 is a side view, with parts separated, of the mounting bracket assembly of FIG. 2A shown in the expanded configuration.
Figures 5A, 6:
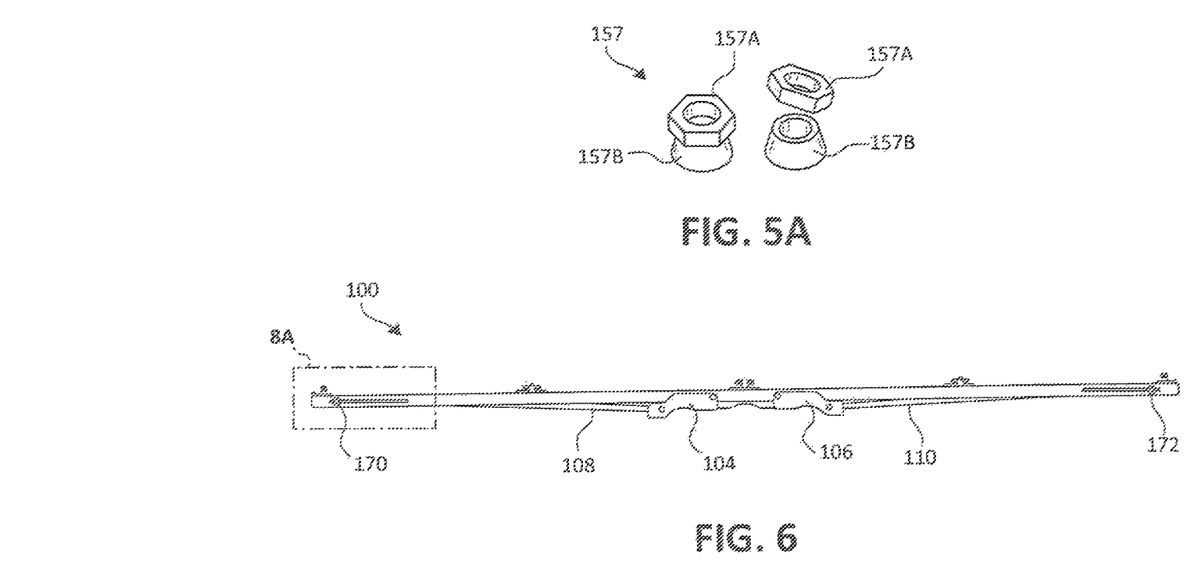
FIG. 5A is a top, perspective view of an alternative embodiment of a coupling nut illustrated in an attached state and a detached state.
FIG. 6 is a side view of the mounting bracket assembly of FIG. 2A shown in the collapsed configuration.

Depicted in FIG. 5A is a nut 157 that may be used with the present disclosure. Specifically, the nut 157 is a break-away sheer nut and may be used in place of nut 156a. The break-away sheer nut 157 may be pre-installed on the bolt 156b. To install to a proper torque setting, all that an installer must do is apply torque to the nut 157 until the hex head 157a separates from the body 157b. The stress-concentration of the break-away sheer nut 157 can be sized such that separation of the hex head 157a occurs upon application of a predetermined pressure to the bolt 156a that will hold the bracket assembly 100 on the torque tube 14. The hex head 157a can then be discarded, but importantly for field installations, proper torque application can be assured without requiring any special tools or fear of over-torqueing of the nut 157a that could result in damage to the torque tube 14 or other components.

With continued reference to FIGS. 2A-6, as briefly mentioned above, the mounting bracket assembly 100 further includes a pair of first and second truss arms 108, 110 that provide support for the braces 104, 106 when in the expanded configuration. Each of the truss arms 108, 110 has a first end portion 108a, 110a and a second end portion 108b, 110b. The first end portion 108a, 110a of each of the truss arms 108, 110 is coupled to the respective second end portion 104b, 106b of the braces 104, 106 via a fastener, such as, for example, a nut and bolt assembly. The first end portion 108a, 110a of each of the truss arms 108, 110 may be disposed within the U-shaped channel 152, 154 of the respective brace 104, 106.

The first end portion 108a, 110a of each of the truss arms 108, 110 is pivotable relative to the respective brace 104, 106 between an in-use or expanded configuration, as shown in FIG. 3, and a shipping or collapsed configuration, as shown in FIG. 4. In the expanded configuration, the truss arms 108, 110 are disposed in oblique or transverse relation to the longitudinal axis "X" of the rail 102 and the braces 104, 106, thus giving the mounting bracket assembly 100 a generally triangular shape or A-shape. In the collapsed configuration, the truss arms 108, 110 are disposed in parallel relation to the rail 102 and the braces 104, 106, thus giving the mounting bracket assembly 100 a substantially linear configuration.

With reference to FIGS. 2A, 5, and 6, the second end portion 108b, 110b of each of the truss arms 108, 110 is slidably coupled to the respective first and second end portions 102a, 102b of the rail 102. In particular, the second end portion 108b, 110b of each of the truss arms 108, 110 is configured to slide along the respective track 136, 138 of the rail 102 between an inward position (FIG. 5), and an outward position (FIG. 6). When the second end portion 108b, 110b of each of the truss arms 108, 110 is in the inward position, the truss arms 108, 110 and the braces 104, 106 are in their respective expanded configurations, and when the second end portions 108b, 110b of each of the truss arms 108, 110 is in the outward position, the truss arms 108, 110 and the braces 104, 106 are in their respective collapsed configurations.

With reference to FIGS. 5-8B, the mounting bracket assembly 100 further includes a pair of first and second fastener assemblies 170, 172. The first fastener assembly 170 slidably couples the second end portion 108b of the first truss arm 108 to the tracks 136 of the first end portion 102a of the rail 100, and the second fastener assembly 172 slidably couples the second end portion 110b of the second truss arm 110 to the tracks 138 of the second end portion 102b of the rail 100. The fastener assemblies 170, 172 are configured to selectively lock the second end portion 108b, 110b of each of the respective truss arms 108, 110 in the inward position. Due to the first and second fastener assemblies 170, 172 being the same or substantially similar, only the first fastener assembly 170 will be described in detail herein.

With specific reference to FIGS. 7A-8B, the first fastener assembly 170 includes a pair of washers 174, 176 and a fastener 178, such as, for example, a nut and a bolt coupling the pair of washers 174, 176 to one another. The washers 174, 176 are disposed on the respective first and second lateral sidewalls 114, 116 of the rail 102, and the fastener 178 extends transversely through the pair of tracks 136 in the first and second lateral sidewalls 114, 116 of the first end portion 102a of the rail 102. The fastener 178 also extends through the second end portion 108b of the first truss arm 108, thereby slidably coupling the second end portion 108b of the truss arm 108 to the first end portion 102a of the rail 102.

The washers 174, 176 of the fastener assembly 170 each include a pair of first and second flanges or tabs 174a, 174b and 176a, 176b extending perpendicularly from an outer periphery thereof. The first and second tabs 174a, 174b and 176a, 176b of each of the washers 174, 176 are disposed on opposite sides of the respective washer 174, 176. The tabs 174a, 174b and 176a, 176b of the washers 174, 176 may have a squared configuration and be dimensioned for receipt in a pair of corresponding slots 180, 180b (FIG. 8A) defined in the first end portion 102a of the rail 102. The slots 180a, 180b are disposed on opposite longitudinal sides of the track 136 and at an inward end of the track 136.

Figure 7A:
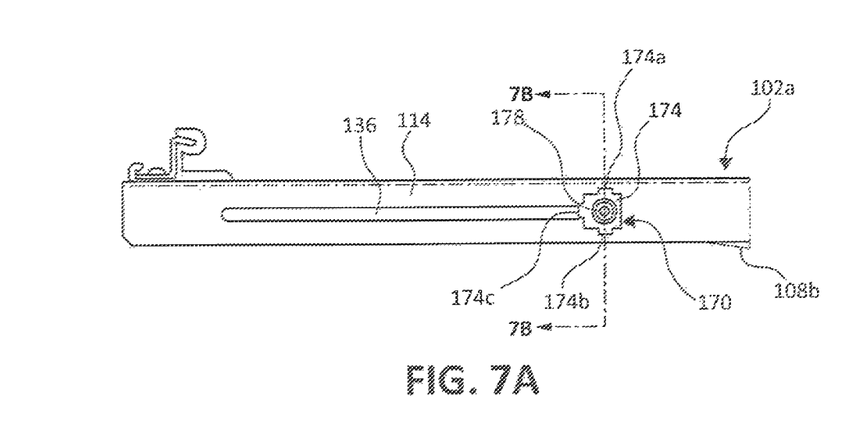
FIG. 7A is an enlarged view of the area of detail designated "7A" in FIG. 5, illustrating a fastener assembly disposed in an inward position relative to a rail of the mounting bracket assembly.

Upon moving the fastener assembly 170 toward the inward position, as shown in FIG. 7A, the tabs 174a, 174b and 176a, 176b of the washers 174, 176 are aligned with the corresponding slots 180a, 180b in the first end portion 102a of the rail 102. An actuation of the fastener 178 drives an approximation of the washers 174, 176, whereby the tabs 174a, 174b of the washers 174, 176 are received in the corresponding slots 180a, 180b in the rail 102 to fix or lock the fastener assembly 170 to the rail 102 and, in turn, lock the second end portion 108b of the first truss arm 108 in the inward position.

The washers 174, 176 may further include a third flange or tab 174c extending perpendicularly from the outer periphery thereof. The third tab 174c is received in the track 136 of the first end portion 102a of the rail 102 to guide the fastener assembly 170 along the track 136. A compression tube 179 (FIG. 7B) may be provided that extends between the walls 114, 116 of the rail 102 and which has the fastener 178 extending therethrough. The compression tube 179 prevents the walls 114, 116 of the rail 102 from collapsing during a tightening of the fastener 178.

Figure 7B:
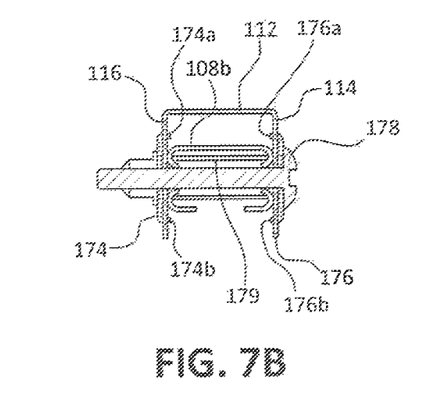
FIG. 7B is a cross-section, taken along line "7B" in FIG. 7A, of the fastener assembly coupled to the rail of the mounting bracket assembly.
Figure 8A:
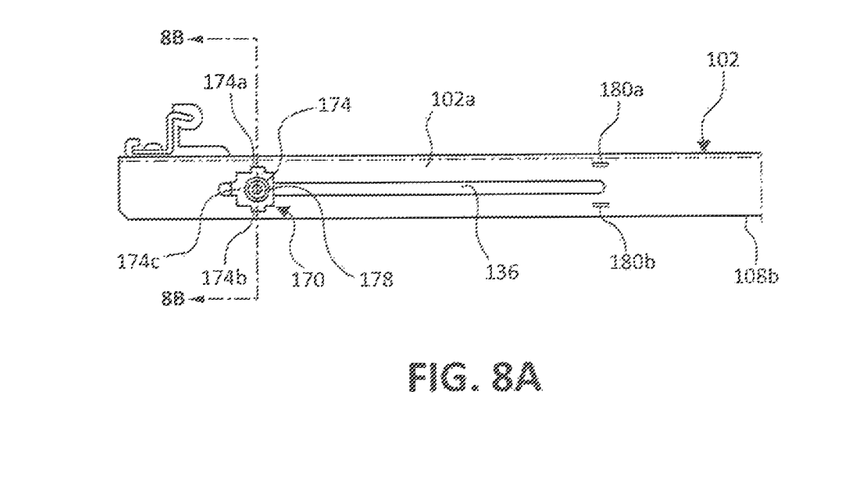
FIG. 8A is an enlarged view of the area of detail designated "8A" in FIG. 6, illustrating the fastener assembly disposed in an outward position relative to the rail of the mounting bracket assembly.
Figure 8B:
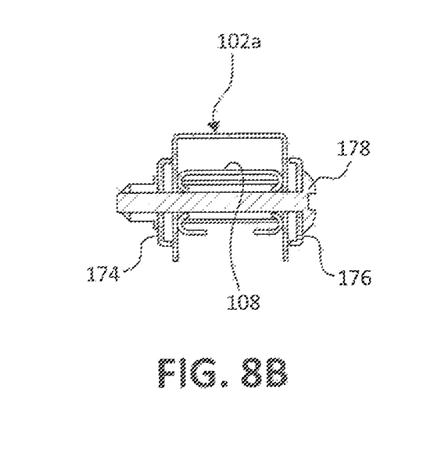
FIG. 8B is a cross-section, taken alone line "8B" in FIG. 8A, of the fastener assembly coupled to the rail of the mounting bracket assembly.

With respect to the compression tubes 179 depicted in FIGS. 7B and 8B, an aspect of the present disclosure relating to the capturing of the compression tube 179 in the truss arms 108 is shown. Specifically, following formation of the hole in the truss arms 108 for receiving the fastener 178, the compression tube 179 can be placed opposite the hole, and a hydraulic press may be employed to flare the edges of the hole into the compression tube 179, thereby pressing the edges that define the hole around and onto the inner periphery of the compression tube 179. The result is two-fold. First, the flared hole is larger than what was originally bored in the truss arm 108 allowing for the passage of a fastener 178 that has a larger diameter than the originally formed hole. The second result is that the compression tube 179 is permanently captured in the truss arm 108 allowing for ease of installation in the field as the installer is no longer required to align the bore of the compression tube 179 with the holes in the truss arms 108.

Figure 9A:
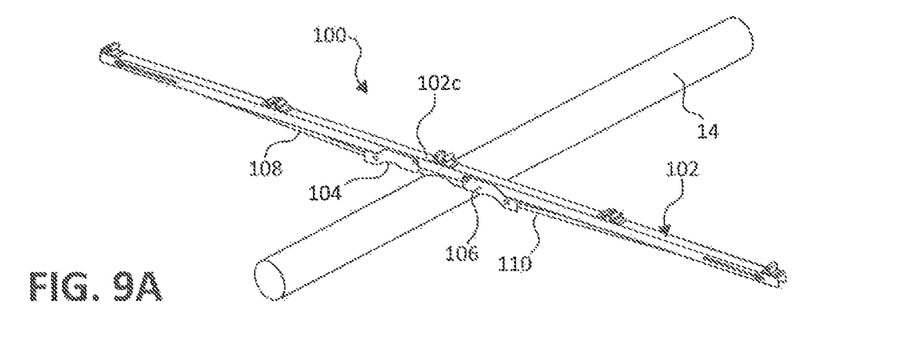
FIG. 9A is top perspective view of the mounting bracket assembly shown in the collapsed configuration and supported on a torque tube of the solar power system of FIG. 1.
Figure 9B:
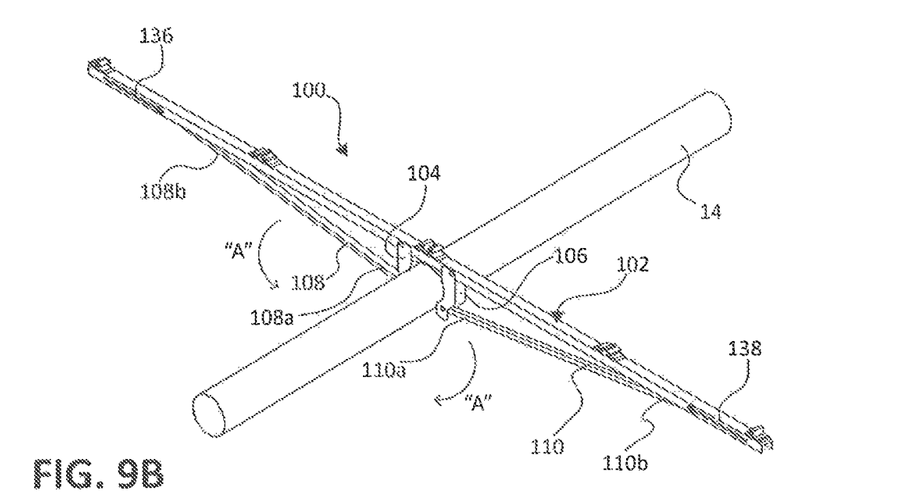
FIG. 9B is top perspective view of the mounting bracket assembly shown in the expanded configuration and supported on the torque tube of the solar power system of FIG. 1.
Figure 9C:
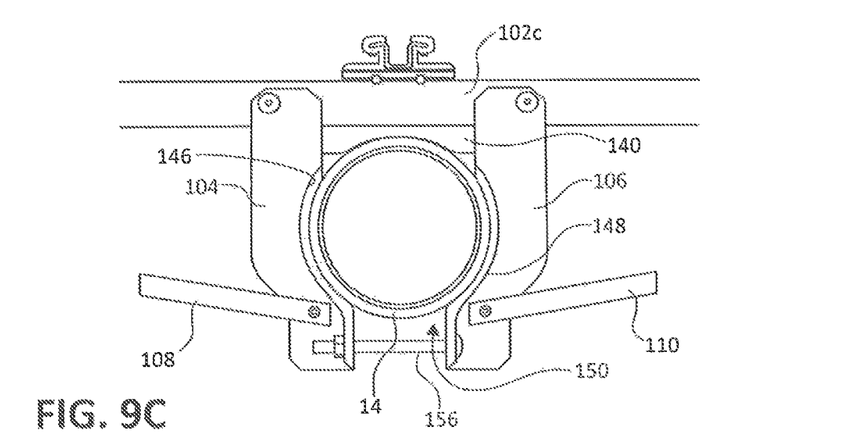
FIG. 9C is an enlarged side view of the mounting bracket assembly shown secured to the torque tube.

During assembly, with reference to FIG. 9A, the mounting bracket assembly 100, while in the collapsed or shipping configuration, is positioned over the torque tube 14 of the solar power system 1 (FIG. 1) with the center portion 102c of the rail 102 overlapping the torque tube 14. In this position, the protuberance 144 (FIG. 3) of the insert 140 abuts the outer surface of the torque tube 14 and the braces 104, 106 are disposed on opposite sides of the torque tube 14. As shown in FIG. 9B, the braces 104, 106 of the mounting bracket assembly 100 are rotated outwardly from the rail 102, in the direction indicted by arrow "A" in FIG. 9B, toward the expanded configuration. Rotation of the braces 104, 106 causes the first end portion 108a, 110a of each of the truss arms 108, 110 to rotate relative to the respective second end portions 104b, 106b of the braces 104, 106. A rotation of the braces 104, 106 is continued until the inner surfaces 146, 148 of the braces 104, 106 capture the torque tube 14 therebetween, as shown in FIG. 9C.

With the torque tube 14 captured within the channel 150 defined by the insert 140 and the braces 104, 106, the main fastener 156 is actuated to approximate the second end portions 104b, 106b of the braces 104, 106, whereby the braces 104, 106 exert an upwardly-oriented force on the torque tube 14 to drive the torque tube 14 into engagement with the protuberance 144 of the insert 140. In embodiments, the concave inner surfaces 146, 148 of the braces 104, 106 may be coated or lined with a similar material as the protuberance 144 to strengthen the frictional engagement with the torque tube 14.

As described above, when the braces 104, 106 enter the expanded configuration, the second end portion 108b, 110b of each of the truss arms 108, 110 is simultaneously moved to the inward position on the respective track 136, 138 of the rail 102. With the second end portions 108b, 110b of the truss arms 108, 110 in the inward position, the first and second tabs 174a, 174b and 176a, 176b of the washers 174, 176 of the fastener assembly 170 are disposed adjacent the slots 180a, 180b defined in the rail 102. To fix the second end portion 108b, 110b of the truss arms 108, 110 in the inward position along the respective track 136, 138, the fastener 178 of the fastener assembly 170 is actuated to drive an approximation of the washers 174, 176, whereby the tabs 174a, 174b and 176a, 176b of the washers 174, 176 are received in the corresponding slots 180a, 180b in the rail 102 to fix or lock the fastener assembly 170 to the rail 102 and, in turn, lock the second end portion 108b of the first truss arm 108 in the inward position.

At this stage, the remaining fasteners of the mounting bracket assembly 100 may be tightened to ensure that the mounting bracket assembly 100 remains fixed in the expanded or in-use configuration. The PV modules 12 are then secured to the rail 102 of the mounting bracket assembly 100 via the coupling devices 120, 134 in the manner described above.

Figure 9D:
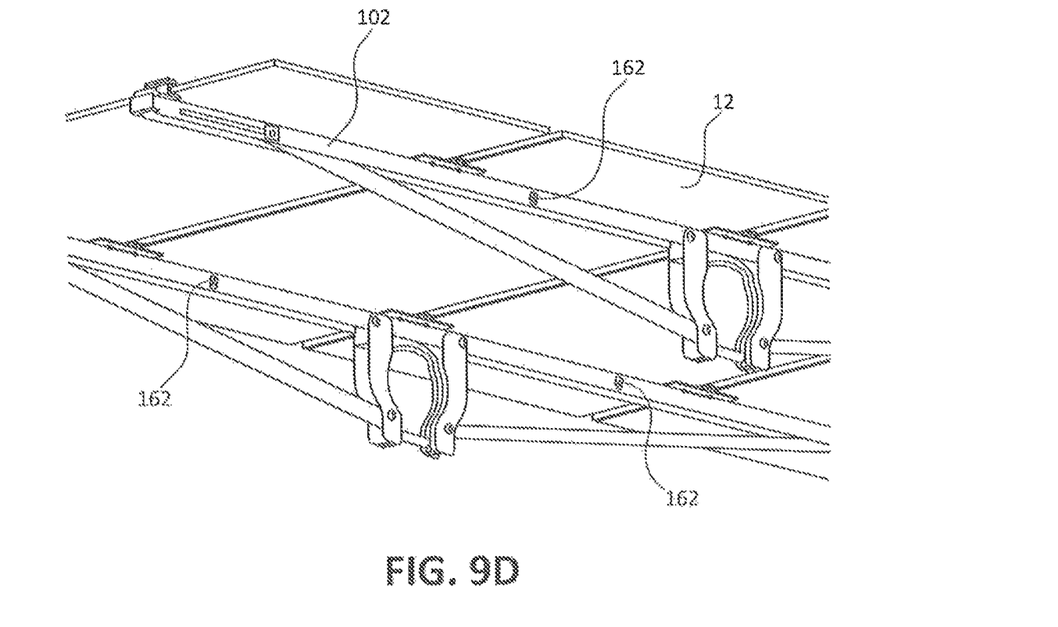
FIG. 9D is a bottom, perspective view of the mounting bracket assembly attached to an underside of an alternative embodiment of a solar module having a wire management clip.
Figure 9E:
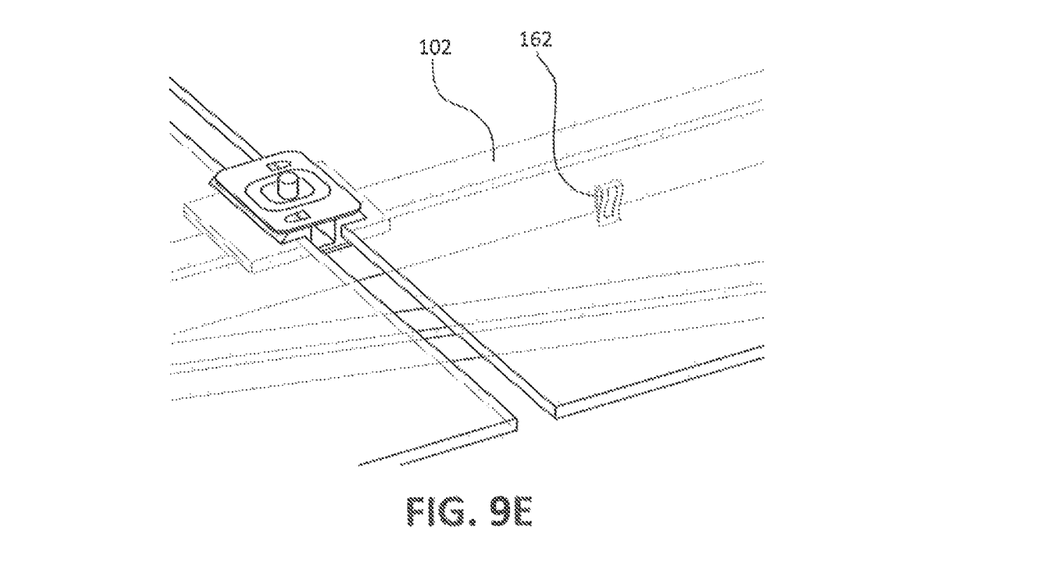
FIG. 9E is a top, perspective view of the solar module of FIG. 9D shown in phantom, thereby revealing the wire management clip.

Yet a further aspect of the present disclosure can be seen in FIGS. 9D and 9E. Specifically, the rail 102 may have pre-installed wire management clips 162 attached to lateral sides of the rail 102. The wire management clips 162 may be axially aligned with one another and spaced along the rail 102. In other embodiments, the clips 162 may be positioned at any suitable location on the rail 102 or other components of the mounting bracket assembly 100. By pre-installing the wire management clips 162, installation of the solar modules 12 and electrical connection of them is eased and made both more efficient as well as ensuring the quality of those electrical connections by having the pre-installed wire management clips 162 available to the installer.

Figure 10:
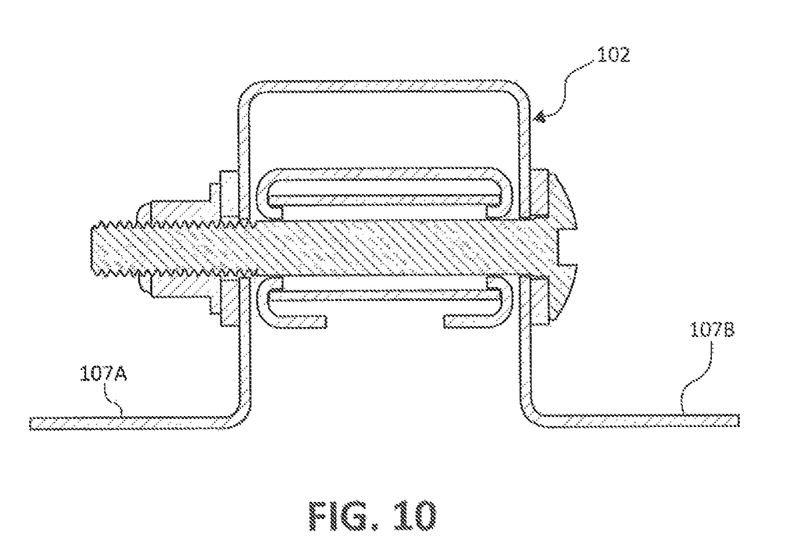
FIG. 10 is a side cross-sectional view of an alternative embodiment of a rail of the mounting bracket assembly.

Finally, though generally described in connection with a rail 102 having a generally C-shaped cross-section, the present disclosure is not so limited. Rather, a variety of cross-sectional shapes may be employed without departing from the scope of the present disclosure. For example, a high hat configuration as depicted in FIG. 10 can be employed. The high-hat rail 102 is similar to the C-shaped rail, but includes two flanges 107a, 107b extending perpendicularly from the channel, which provide further stability for the rail 102. In aspects, the flanges 107a, 107b may extend at any suitable angle relative to the body of the rail.

In embodiments, the fasteners described herein may be any suitable fastening mechanism, including, but not limited to, adhesives, hinges, clips, ties, straps, belts, tapes and/or fabric hook-and-loop fasteners.

It will be understood that various modifications may be made to the embodiments disclosed herein. Therefore, the above description should not be construed as limiting, but merely as exemplifications of various embodiments. Those skilled in the art will envision other modifications within the scope and spirit of the claims appended thereto.

The invention claimed is:

1. A mounting bracket assembly, comprising:
   a rail having a first longitudinal axis; and
   a pair of braces each having a first end portion movably coupled to the rail, each of the pair of braces terminating at a second, opposite end portion, each of the pair of braces having a second longitudinal axis extending between the first and second end portions, wherein the pair of braces is movable relative to the rail between a collapsed configuration, where the second longitudinal axes of the pair of braces are parallel with the rail, and an expanded configuration, wherein the pair of braces is perpendicular to the rail, in which the pair of braces cooperatively define a channel dimensioned for receipt of a torque tube.

2. The mounting bracket assembly according to claim 1, wherein the mounting bracket assembly assumes a linear shape when the pair of braces is in the collapsed configuration.

3. The mounting bracket assembly according to claim 1, wherein the mounting bracket assembly assumes a triangular shape when the pair of braces is in the expanded configuration.

4. The mounting bracket assembly according to claim 1, further comprising a fastener configured to attach to the second end portion of each of the pair of braces to fix the pair of braces in the expanded configuration.

5. The mounting bracket assembly according to claim 1, further comprising a protuberance protruding downwardly relative to an underside of the rail, wherein the protuberance extends into the channel defined by the pair of braces when the pair of braces is in the expanded configuration.

6. The mounting bracket assembly according to claim 1, further comprising a plurality of coupling devices disposed on an upper side of the rail, wherein the plurality of coupling devices is configured to fix a solar module to the rail.

7. The mounting bracket assembly according to claim 1, further comprising a pair of truss arms.

8. The mounting bracket assembly according to claim 7, wherein the pair of truss arms is configured to move relative to the rail and the pair of braces between a collapsed configuration, in which the pair of truss arms is parallel with the rail and the pair of braces, and an expanded configuration in which the pair of truss arms extend obliquely relative to the rail.

9. The mounting bracket assembly according to claim 8, wherein an end portion of each of the pair of truss arms is configured to slide away from a central portion of the rail as the pair of truss arms move towards the collapsed configuration.

10. The mounting bracket assembly according to claim 8, wherein an end portion of each of the pair of truss arms moves along the rail from an inward position, in which the pair of truss arms assumes the expanded configuration, toward an outward position, in which the pair of truss arms assumes the collapsed configuration.

11. The mounting bracket assembly according to claim 7, wherein a first end portion of the rail and a second end portion of the rail defines a track through which an end portion of the pair of truss arms slides.

12. The mounting bracket assembly according to claim 11, further comprising a fastener assembly coupled to the end portion of a truss arm of the pair of truss arms, wherein the fastener assembly is configured to selectively fix the end portion of the truss arm in a portion on the track of the rail.

13. The mounting bracket assembly according to claim 12, wherein the fastener assembly includes:

a pair of washers disposed on opposite sides of the rail, at least a first washer of the pair of washers having a pair of first and second tabs extending therefrom, the pair of first and second tabs being configured for receipt in a corresponding slot defined in the rail; and a fastener coupling the pair of washers to one another and configured to adjust a distance between the pair of washers.

14. The mounting bracket assembly according to claim 13, wherein the first washer of the fastener assembly further includes a third tab extending therefrom, the third tab being disposed in the track of the rail to guide the fastener through the track.

* * * * *